US011397783B1

(12) United States Patent
Caro et al.

(10) Patent No.: US 11,397,783 B1
(45) Date of Patent: Jul. 26, 2022

(54) RANKING SIMILAR USERS BASED ON VALUES AND PERSONAL JOURNEYS

(71) Applicant: INTUIT INC., Mountain View, CA (US)

(72) Inventors: Vi Joy Caro, San Diego, CA (US); James Jennings, San Diego, CA (US); Tia Krupa, La Mesa, CA (US)

(73) Assignee: INTUIT, INC., Mountain View, CA (US)

( * ) Notice: Subject to any disclaimer, the term of this patent is extended or adjusted under 35 U.S.C. 154(b) by 235 days.

(21) Appl. No.: 16/218,355

(22) Filed: Dec. 12, 2018

(51) Int. Cl.
| *G06F 16/903* | (2019.01) |
| *G06F 16/906* | (2019.01) |
| *G06F 16/9035* | (2019.01) |
| *G06N 3/04* | (2006.01) |
| *G06F 16/9535* | (2019.01) |

(52) U.S. Cl.
CPC ........ *G06F 16/9535* (2019.01); *G06F 16/906* (2019.01); *G06F 16/9035* (2019.01); *G06F 16/90335* (2019.01); *G06N 3/04* (2013.01)

(58) Field of Classification Search
CPC ............... G06F 16/9535; G06F 16/906; G06F 16/90335; G06F 16/9035
See application file for complete search history.

(56) References Cited

U.S. PATENT DOCUMENTS

| 8,301,692 | B1* | 10/2012 | Hamaker | ........... G06Q 30/0631 |
| | | | | 709/203 |
| 2014/0047045 | A1* | 2/2014 | Baldwin | ................. H04L 51/32 |
| | | | | 709/206 |
| 2016/0098404 | A1* | 4/2016 | Rubenczyk | ......... G06F 16/9535 |
| | | | | 707/728 |
| 2018/0196877 | A1* | 7/2018 | Mertens | ........... G06F 16/24575 |
| 2019/0273510 | A1* | 9/2019 | Elkind | ...................... G06F 8/74 |
| 2020/0104395 | A1* | 4/2020 | Bhatia | ................. G06N 3/0472 |

* cited by examiner

*Primary Examiner* — Charles D Adams
(74) *Attorney, Agent, or Firm* — Patterson & Sheridan, LLP

(57) ABSTRACT

Certain aspects of the present disclosure provide techniques for ranking users based on similarity. One example method generally includes receiving a request to view a list of users similar to a user based on personal information and receiving user data generated based on attribute data and financial data associated with the user comprising value data of the user. The method further includes obtaining clusters comprising value data of a plurality of users based on mapped data of the plurality of users and determining, by comparing the value data of the user data with the value data of the clusters, a cluster of vectors similar to the user data. The method further includes generating, based on a list of user identifiers using a distance function, a ranked list of similar users and transmitting the ranked list of similar users to a user device for display.

18 Claims, 7 Drawing Sheets

RANKING SIMILAR USERS BASED ON VALUES AND PERSONAL JOURNEYS

INTRODUCTION

Aspects of the present disclosure relate to using machine learning techniques determining the similarity of users in order to make follow recommendations.

One way to improve the user experience with a software application is to recommend other users to follow. For example, consider a social networking application that allows users to follow other users in order to see content posted by the other users. Such a social networking application may provide recommendations of users that the social networking application determines may produce content that a user would want to see.

However, such "following" services are typically reserved for content producing or content posting applications, such as TWITTER®, INSTAGRAM® or FACEBOOK®, and as a result may only be able to provide superficial recommendations to users. More meaningful recommendations may allow users to identify groups of users in similar situations or with similar goals, and form communities allowing for mutual support and encouragement.

More meaningful recommendations may be a direct result of using more detailed data about various users, such as financial data. Historically, financial data has not been used for such determinations, and consequently, existing recommendation systems are unable to properly leverage financial information. For example, existing recommendations systems lack the capability to transform numerical financial data into meaningful categorical data.

Thus, systems and methods are needed for numerically estimating the values of users based on numerical data.

BRIEF SUMMARY

Certain embodiments provide a method for ranking users based on similarity. The method generally includes receiving a request to view a list of users similar to a user based on personal information and receiving user data generated based on attribute data and financial data associated with the user comprising value data of the user. The method further includes obtaining clusters comprising value data of a plurality of users based on mapped data of the plurality of users wherein the clusters are generated by operation of an autoencoder neural network and a clustering model using the mapped data as input and determining, by comparing the value data of the user data with the value data of the clusters, a cluster of vectors similar to the user data, wherein the cluster of vectors corresponds to a list of user identifiers. The method further includes generating, based on the list of user identifiers using a distance function, a ranked list of similar users and transmitting the ranked list of similar users to a user device for display.

Other embodiments provide a computing system including a processor and memory, the memory including instructions for performing the above method for ranking users based on similarity.

Still other embodiments provide a method for generating clusters of a plurality of users. The method generally includes obtaining, from a user information database, a set of user attribute data and a set of user financial data associated with a plurality of users and generating, based on the set of user attribute data and the set of user financial data, mapped data. The method further includes generating, by an autoencoder neural network based on the mapped data, an embedding and generating, by a clustering model, clusters of the embedding. The method further includes receiving a request for the clusters from an application server and transmitting the clusters to the application server.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
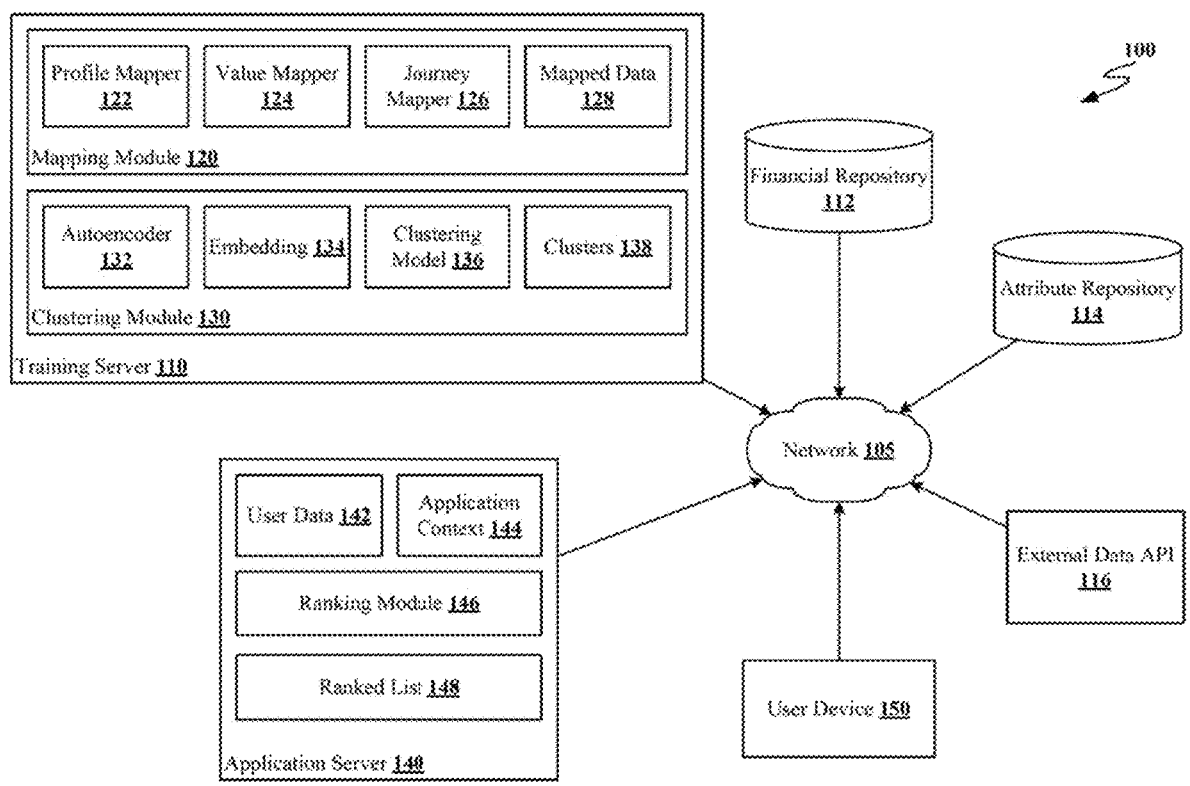
FIG. 1 depicts an example computing environment for executing a similarity service.

Aspects of the present disclosure provide apparatuses, methods, processing systems, and computer readable mediums for determining the similarity of users in order to make follow recommendations.

Provided herein is a similarity service that can effectively transform financial and other user data into categorical data (such as estimations of user values), in order to compare and recommend similar users for a particular user to follow.

The similarity service may obtain data from a plurality of users. For example, if the similarity service is associated with a financial services application, the similarity service may obtain data related to all users of the financial services application. The data obtained may include attribute data and financial data about the plurality of users. Financial data includes information of the financial situation of a user, such as information that may be available from a tax return or from a credit report, in addition to more detailed accounting information, if available. Attribute data may include any information known about the user that is not generally financial in nature, such as location of residence, marital status or other information.

The similarity service then uses the obtained data to train and execute various machine learning models, ultimately producing clusters of similar vectors, with each vector of a cluster corresponding to a particular user of the plurality of users. The steps resulting in the production of this clustering can be referred to collectively as training and are described in further detail below.

After training, the similarity service may receive a request from a user to view similar users. If the user is part of the existing plurality of users, the similarity service locates a cluster within the clusters including the vector representing the user. Then, using the clusters, the similarity service generates a ranked listed of similar users. If the user is requesting to view similar users from within a particular application, the similarity service can take into account the section of the particular application (the context of the application) to refine or alter the ranked list of similar users before presenting it to the user.

Unlike existing recommendation systems, the described similarity service can collect and use in-depth information, such as financial data, in order to construct a meaningful categories corresponding to the user. For example, the similarity service can estimate the probability that a user holds certain values using obtained data of the user, such as by inferring a user values familial connections by determining the user spends a significant amount of money on certain family-related products or services. The similarity service can then recommend the user follow other users who similarly value familial connections. By so doing, the similarity service can identify and display a list of users that are similar in more significant ways than existing recommendation systems provide, by comparing the meaningful categories of data between users. Additionally, by utilizing the application context for a user at a particular point in the flow of an application, the similarity service can provide lists of similar users that may assist the user in understanding the particular point in the flow of the application owing to their own similar experiences.

FIG. 1 depicts an example computing environment 100 for executing a similarity service. Computing environment 100 includes training server 110, financial repository 112, attribute repository 114, external data API 116, application server 140, and user device 150, which are all connected via network 105. Computing environment 100 is associated with an application that executes through a server-client relationship between application server 140 and a plurality of client user devices.

In general, execution of the similarity service begins with training server 110 obtaining data for a plurality of users from financial repository 112, attribute repository 114 and external data API 116. In some examples, data may be obtained from only some of these sources, and in other cases data may not be available for all users from all sources. In such examples, the similarity service can treat missing entries as null values rather than representing missing numerical entries (e.g., expenses) as zero. Although financial repository 112, attribute repository 114 and external data API 116 are shown as accessible to training server 110 via network 105 in this example, in other examples financial repository 112, attribute repository 114 and external data API 116 may be connected to training server 110 or application server 140 in a different manner.

Financial repository 112 may be a repository or database of financial data for the plurality of users. Financial data may include income, deductions, expenses, available tax credits, credit scores, value of assets or other finance-related information. The financial data for the plurality of users may have previously been collected by a financial services application associated with computing environment 100.

Attribute repository 114 may be a repository or database of attribute data for the plurality of users. The attribute data may include any information known about the user that is not generally financial in nature, such as location of residence, marital status, and may have been collected by the financial services application mentioned above or other applications associated with computing environment 100.

External data API 116 is an API from an external service that makes information about the user available to third parties relative to the API, such as the similarity service in this example. For example, some social networks may provide an externally accessible API for third-parties to make use of social network data, and such information may fall under the categories of financial data or attribute data as discussed above.

Training server 110 is a computing device including at least a processor and a memory (not shown). Although shown as a single system, in other embodiments the functions of training server 110 may be performed by a plurality of computing systems, or by a cloud computing system, or both. Training server 110 includes mapping module 120 and clustering module 130.

Mapping module 120 is a software routine executing on training server 110 to map various user data to a set of mapped user data. Mapping module 120 includes profile mapper 122, value mapper 124, journey mapper 126 and mapped data 128.

Profile mapper 122 is a component used to generate a financial profile for users based on the obtained financial data and attribute data. Value mapper 124 is a component used to generate an array representing the likelihood a user has certain values. Journey mapper 126 is a component used to generate a set of journey points for each user representing significant events the user has experienced. Together, the financial profiles, value arrays and sets of journey points comprise mapped data 128. The functions of mapping module 120 are described in further detail below with respect to FIG. 2.

Mapping module 120 generates mapped data 128, which is then provided to clustering module 130. Mapped data 128 is data related to plurality of users which has been transformed or mapped into various categories. In particular, mapped data 128 includes a set of financial profiles of the plurality of users, a set of value arrays corresponding to estimations of held values of the plurality of users, and a set of journey arrays corresponding to completions of various life events by the plurality of users. In some examples mapped data 128 is a set of vectors corresponding to the above information.

Clustering module 130 is a component executing on training server 110, which converts mapped data 128 into clusters 138. Clusters 138 are mapped data 128 after being clustered, so that each cluster of clusters 138 is a set of similar data points representing similar users of the plurality of users. If mapped data 128 is a set of vectors, clusters 138 may be represented by a vector space including the vectors of mapped data 128, clustered together.

Clustering module 130 includes autoencoder 132, embedding 134, clustering model 136, and clusters 138. The functions of clustering module 130 are described in further detail below with respect to FIG. 3. In general, clustering module 130 provides mapped data 128 to autoencoder 132 as input to generate embedding 134. In some embodiments, autoencoder 132 is an autoencoder neural network, and embedding 134 is a transformation of mapped data 128 to a lower-dimensionality representation generated by the operation of autoencoder 132.

Clustering model 136 is a machine learning model based on a clustering algorithm. Clustering model 136 generates clusters 138 based on embedding 134. If embedding 134 consists of a set of vectors, then clustering model 136 calculates the similarity of the set of vectors to establish clusters of similar vectors. The clusters identified within embedding 134, which correspond to clusters of similar users, as a cluster of similar vectors corresponds to a set of similar users represented by those vectors.

After generating clusters 138, training server 110 can respond to a request from application server 140 for clusters 138, so that application server 140 can use clusters 138 to calculate similar users for a particular user.

Application server 140 is a computing device including at least a processor and a memory (not shown), associated with one or more applications. Application server 140 is used to send application data to user device 150, to allow a user of user device 150 to use the application, such as by transmitting subsequent screens of the application to user device 150.

Although shown as a single system, the function of application server 140 may be performed by a plurality of computing systems, or by a cloud computing system, or both. Further, although shown as separate computing systems in other embodiments the functions of training server 110 and application server 140 may be performed by a single computing device.

User data 142 is a data entry from mapped data 128 representing a single user, or an independently generated set of data including the same information (or the same type of information) as a data entry of mapped data 128. That is, user data 142 is a financial profile, a value array and a journey array for a single user of the similarity service.

Application context 144 is representation of the current state within the application that the user has reached. For example, for an application consisting of a number of screens, application context 144 may be an identification of the current screen the user is on. Application server 140 accepts clusters 138 from training server 110 and provides clusters 138, user data 142 and application context 144 to ranking module 146 to produce ranked list 148.

Ranking module 146 is a component executing on application server 140 that generates ranked list 148 based on clusters 138, user data 142 and application context 144. The functions of ranking module 146 are described in further detail below with respect to FIG. 3. In general, ranking module 146 makes use of user data 142 to identify the cluster associated with the user within clusters 138. Then, ranking module 146 determines which other points within the cluster associated with the user are most similar to the point associated with user data 142, with the most similar points being ranked to form ranked list 148. Ranking module 146 may then refine ranked list 148 based on application context 144.

Thereafter, application server 140 provides ranked list 148 to user device 150 for display on a display device (e.g., a screen) of user device 150.

User device 150 is a computing device operated by the user, such as a desktop computer, laptop computer, smartphone or tablet. User device 150 may include a client corresponding to application server 140 which the user can use to access the application. In some embodiments, application server 140 may further provide various user interface elements for display by the client that allow the user to follow the users listed in ranked list 148, such as by providing links to access accounts of the users listed on various platforms or communities.

Computing environment 100 can, in general, respond to a request for a list of similar users from the user, by generating ranked list 148 and transmitting ranked list 148 to user device 150. Because computing environment 100 makes use of meaningful data (such as from financial repository 112 and attribute repository 114) and generates categorical information such as value arrays, computing environment 100 generates a list of similar users based on a more meaningful information than existing recommendation or following services. Existing systems fail to make such meaningful determinations due to the difficultly in transforming numerical user data into meaningful categorical data.

Figure 2:
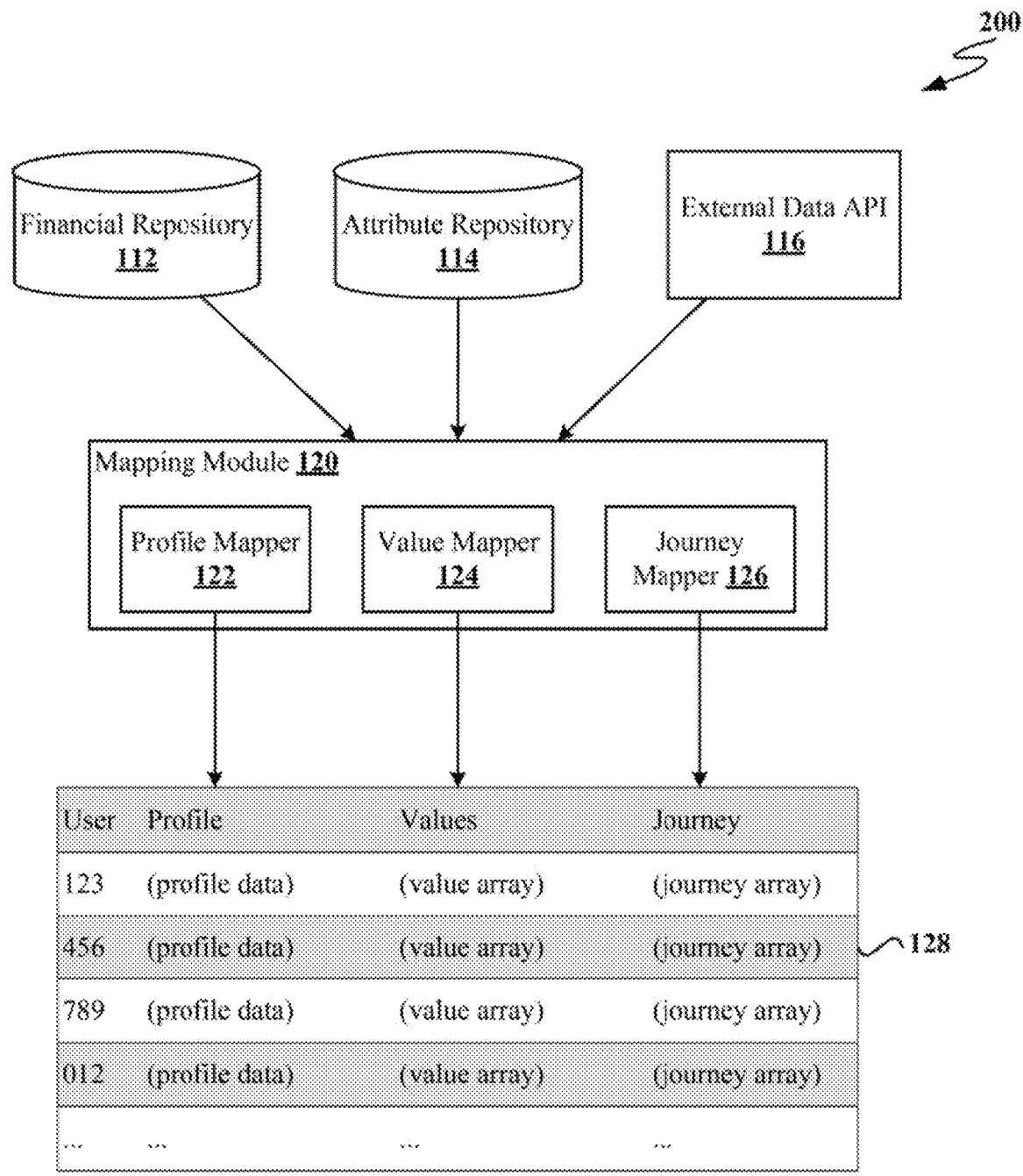
FIG. 2 is information flow diagram depicting the generation of mapped user data.

FIG. 2 is information flow diagram depicting operations 200 for generating mapped user data. Operations 200 include financial repository 112, attribute repository 114, external data API 116, mapping module 120, and mapped data 128. As discussed above, mapping module 120 receives financial and attribute data for a plurality of users from financial repository 112, attribute repository 114, and external data API 116. This financial and attribute data is passed to profile mapper 122, value mapper 124 and journey mapper 126.

Profile mapper 122 uses the financial and attribute data to generate a financial profile for each of the plurality of users, and thereafter stores the financial profile as part of mapped data 128. The financial profile may include tax return information, such as income, tax credits, tax deductions, type of tax filing, and general tax complexity, just to name a few examples. The financial profile may also include calculated or inferred information, such as spending habits, the value and contents of debt and asset portfolios, or credit report information, to name a few.

In some embodiments this financial profile may further be used to construct a financial score (not shown). Such a financial score may represent an overall health or state of a particular user's finances. For example, by assigning point values (e.g., 1 to 5) to different categories of financial information (e.g., income, debt-to-income ratio, and credit score) a composite financial score may be calculated. Thus, a user with high income, low debt-to-income ratio, and a high credit score may be given a relatively high score for each category and thus relatively high overall financial score. By then separating financial scores into different categories (e.g., 3-6, 7-9, 10-13, 12-15), a generalized financial health level may be determined for a user and an assigned profile type. A profile type is a categorization of a user's financial profile that can be displayed to the user or used to allow the user to follow other users with the same profile type.

Value mapper 124 uses the financial and attribute data to generate a value array for each of the plurality of users and store these value arrays in mapped data 128. Potential values include, for example, being a thrifty spender, being a church-goer, or highly valuing familial connections. The values may be inferred by analyzing the available financial and profile data. For example, a high probability of being a thrifty spender may be established by financial data indicating low purchases relative to income or by high savings relative to income. A value array is an ordered sequence of value probabilities, wherein each value in the array corresponds to a probability associated with a particular value.

Consider a simplified example of a value array of two values, "thrifty spender" and "church-goer" (actual value arrays may have many more values). If such an array is sequenced as "thrifty spender" first and "church-goer" second, the array may be represented as [0.50, 0.75], meaning value mapper 124 has a 50% confidence of the user being a thrifty spender and value mapper 124 has a 75% confidence of the user being a church-goer.

Journey mapper 126 uses the financial and attribute data to generate a journey array for each of the plurality of users and store these journey arrays in mapped data 128. The journey arrays include information relating to a user going through various journey points, such as graduating from school, starting a first job, buying a home, or other significant events. Journey mapper 126 may analyze the financial and attribute data to infer the completion of such journey points. For example, journey mapper 126 may use financial data to determine a user has taken out a mortgage, which strongly indicates that the user has purchased a home. Similarly, journey mapper 126 may determine through analysis of the financial data that the user has begun claiming a dependent child on the user's tax returns, which strongly indicates the user has become a parent.

Like the value arrays discussed above, a journey array is an ordered sequence of data entries. Unlike the value arrays, however, a journey array may be a binary entry indicating whether or not the event has occurred. Consider a simplified example of a journey array of two journey points, "bought a house" and "marriage." If such a journey array is sequenced as "bought a house" first and "marriage" second, the journey array may be represented as [0, 1], meaning the user has not bought a house but is married.

As shown, mapped data 128 is a combination of financial profiles, value arrays, and journey arrays for the plurality of users. Each set of financial profiles, value arrays and journey arrays may be associated with a particular user identifier, in this example a three digit code corresponding to a particular user. Although shown in tabular form and segmented for simplicity, mapped data 128 may take the form of arrays for the users, where for each user there is a single array consisting of a financial profile, a value array and a journey array concatenated together. Mapped data 128 may also be vectors for the users, where for each user there is a vector with a financial profile, a value array, and journey array are used as dimensions.

Figure 3:
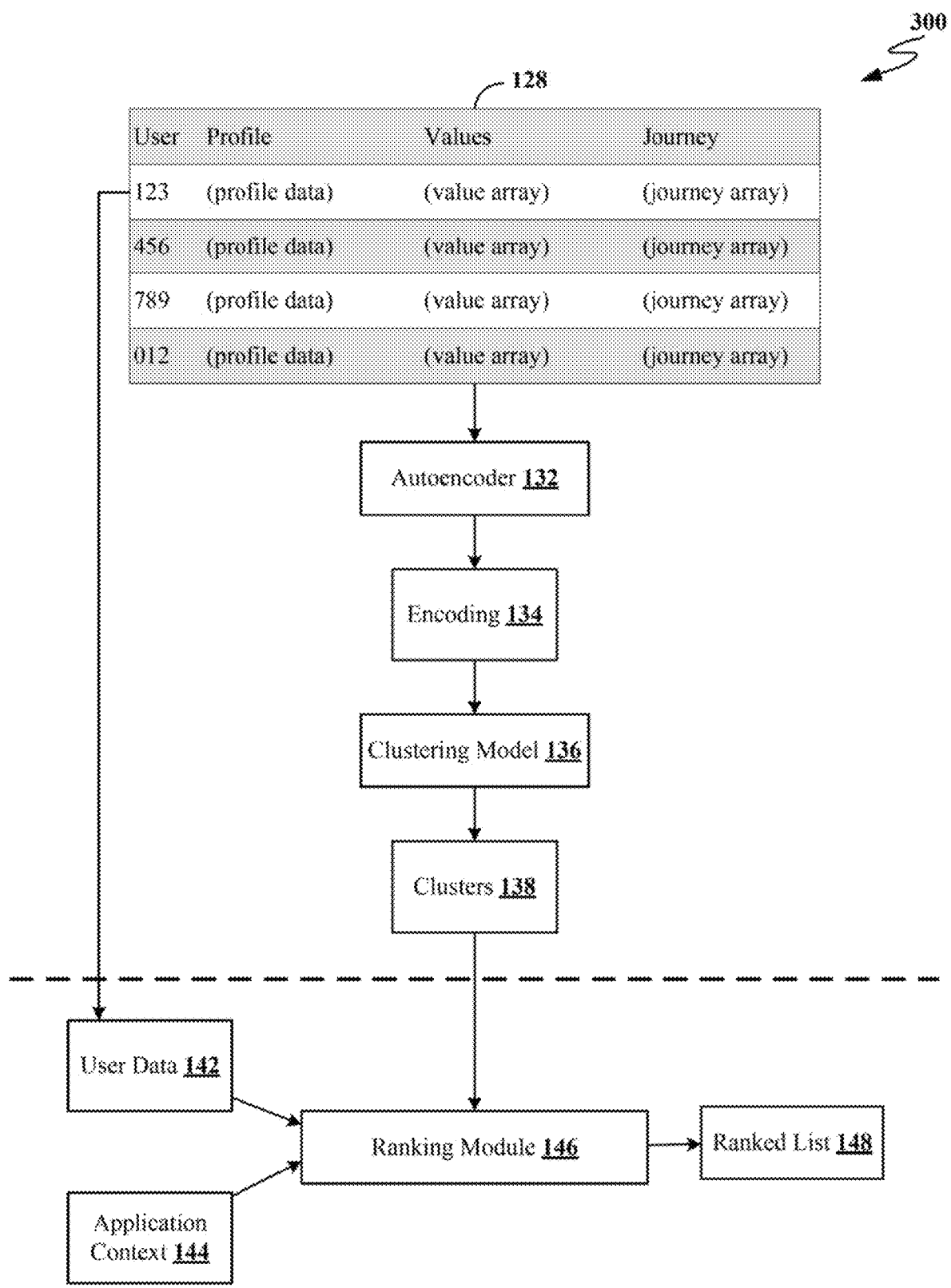
FIG. 3 is a conceptual diagram of operations for determining a ranked list of similar users.

FIG. 3 is a conceptual diagram of operations 300 for determining a ranked list of similar users. Operations 300 are divided, by the dotted line, into training operations above the dotted line (which may be performed by a training server such as training server 110 of FIG. 1) and runtime operations below the dotted line (which may be performed by an application server such as application server 140 of FIG. 1). The training operations involve mapped data 128, autoencoder 132, encoding 134, clustering model 136, and clusters 138, while the runtime operations involve user data 142, application context 144, clusters 138, ranking module 146, and ranked list 148.

The training operations begin by providing mapped data 128 to autoencoder 132. In this example, autoencoder 132 is an autoencoder neural network configured to generate embedding 134. To do so, autoencoder 132 compresses, through the use of one or more hidden layers in the neural network, mapped data 128 to a lower dimensionality representation of mapped data 128.

For example, a lower dimensionality representation of a vector may be a vector with less dimensions than the original vector. Dimensionality reduction may have many benefits, such as making computations more process and space efficient, as well as reducing "noise" in the vector data. Because vectors may sometimes have values for very few dimensions (e.g., a vector for a given user may have largely incomplete data), dimensionality can usually be reduced without losing the "signal" in the data. Many possible dimensionality reduction techniques exist, such as principal component analysis, non-negative matrix factorization, linear discriminator analysis, non-linear discriminator analysis, and the skip-gram with negative sampling technique.

After producing the lower dimensionality representation of mapped data 128, autoencoder 132 attempts to recreate the input (mapped data 128) based on the lower dimensionality representation. If mapped data 128 is a set of vectors, the recreated data is also a set of vectors. Autoencoder 132 then compares the recreated input with the actual input (mapped data 128) for differences, such as values of dimensions of the vectors not matching. After comparing the difference between mapped data 128 and the eventual output (the recreated input), autoencoder 132 backpropagates the difference through the neural network and performs the process again. Backpropagation refers to a process of calculating the gradient at the maximum of a cost function comparing the recreated input with the actual input. By propagating this gradient "back" through the hidden layers, the weights that define autoencoder 132 can be modified to produce more accurate output on a subsequent attempt to recreate the input.

This process may be repeated until the difference between mapped data 128 and the eventual output has reached a certain accuracy threshold (e.g., the difference is small enough) or until subsequent improvement in accuracy has reached an improvement threshold (e.g., many sequential attempts have produced little improvement). When either threshold has been reached, the hidden layer (the lower dimensionality representation) has become an accurate representation of the input, as the ability to recreate the input indicates that it has retained the essential information of the input. Thus, the lower dimensionality representation may be saved as embedding 134. Embedding 134 is a lower dimensionality representation of mapped data 128. Embedding 134 is, as discussed above, the intermediary output autoencoder 132, the compressed or lower dimensionality version of mapped data 128. Thus, if mapped data 128 is a set of vectors, with each vector corresponding to a particular user, then embedding 134 is a set of lower dimensional vectors, with each vector also corresponding to a particular user. To retain the "signal" of mapped data 128, embedding 134 includes the information of mapped data 128 that most distinguishes data points within mapped data 128 from each other.

Embedding 134 can then be provided to clustering model 136. Clustering model 136 is a machine learning model based on a clustering algorithm (e.g., a computer-implemented algorithm used to cluster data points together), which can cluster together the data points of embedding 134. Clustering together data points involves determining which data points are more similar to others within defined groups (clusters) than the members of the clusters are to other data points of the entire data set. Possible varieties of clustering algorithms for use include k-means clustering algorithms, density-based spatial clustering algorithms, mean-shift clustering algorithms, expectation-maximization clustering algorithms or agglomerative hierarchical clustering algorithms. If embedding 134 consists of a set of vectors, then clustering model 136 calculates the similarity of the set of vectors (such as by using cosine similarity) to establish clusters of similar vectors.

The output of clustering model 136 is clusters 138. Clusters 138 identify users whose respective representations are part of a single cluster. If clusters 138 are a clustering of vectors, clusters 138 may be represented by a vector space with vectors identified by cluster, or may be a listing of user identifiers associated, with user identifiers of a particular cluster listed together.

Runtime operations begin with user data 142 (data of a single user as taken from mapped data 128), application context 144, and clusters 138 being provided to ranking module 146. In other examples user data 142 can be sourced from outside mapped data 128, such as a separate database.

The object of the process performed by ranking module 146 is to generate a ranked list of users similar to the user associated with user data 142.

Ranking module 146 accesses user data 142 to obtain a user identifier, and locates, within clusters 138, a representation (such as a vector) associated with the user identifier. Then, ranking module 146 obtains the information of all other representations within that cluster and uses a distance function to determine the most similar users (e.g., the closest vectors to the vector associated with user data 142) from most to least similar. Then, ranking module 146 may select a number (e.g., n) of the top ranked users (such as a top ten) and save the top number of the ranked users as ranked list 148. In some embodiments ranking module 146 may save all users associated with the cluster as ranked list 148.

Ranking module 146 may also use application context 144 to alter or refine ranked list 148 based on the type of application used by the user or a point within the application the user is currently in. For example, if ranked list 148 is to be displayed to the user in a tax preparation application, application context 144 may be used to restrict the comparison of users to tax-related information. As a further example, if ranked list 148 is to be displayed to the user in a financial services application while the user is accessing payroll information, application context 144 may be used to weight the comparison of users by payroll information more heavily.

Figure 4:
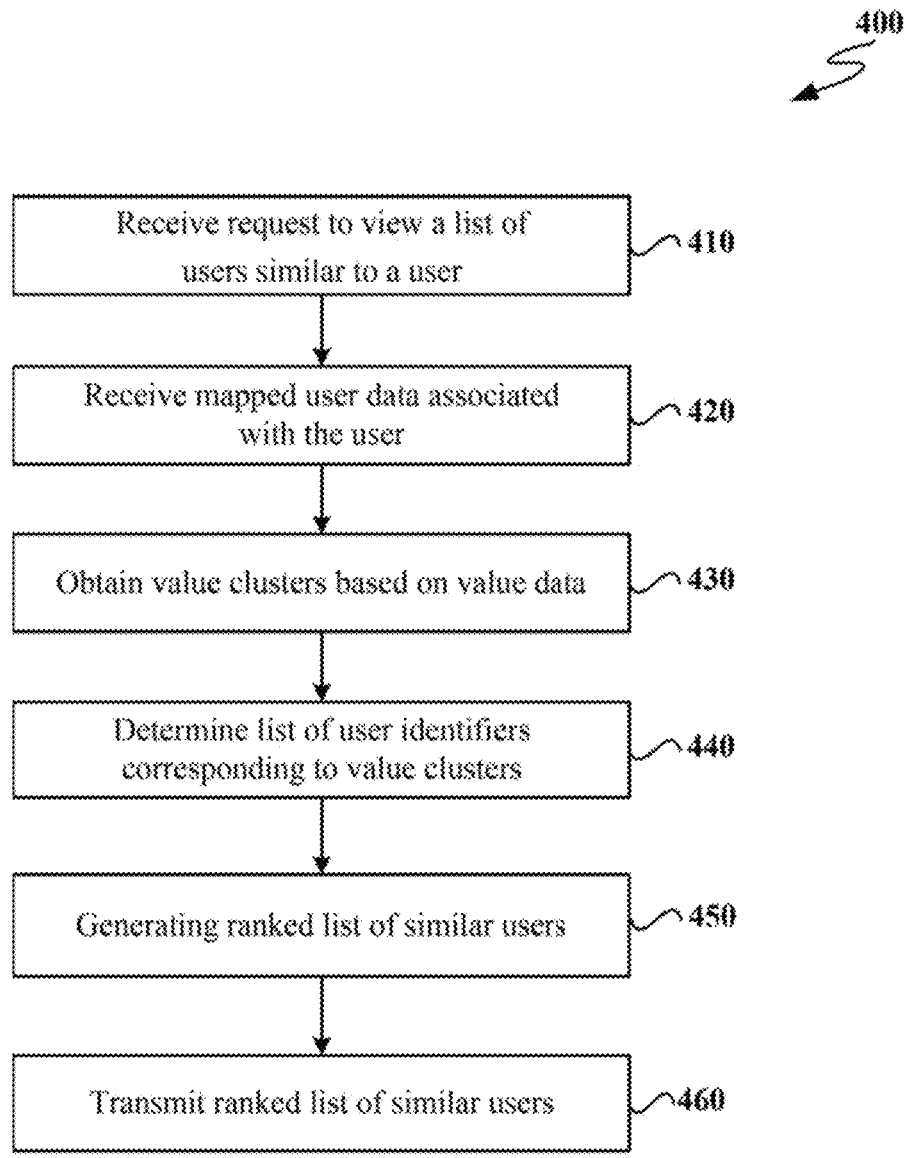
FIG. 4 is a flow diagram of a method for ranking users based on similarity.

FIG. 4 is a flow diagram of a method 400 for ranking users based on similarity. Method 400 may be performed by an application server, such as application server 140 of FIG. 1.

Method 400 starts at 410, where the application server receives a request to view a list of users similar to a user based on personal information, such as attribute data and financial data, of users. Such a request may be related to an application associated with the application server. The request may be sent by a client executing on a user device associated with the user, such as if the user has requested to view similar users. In other cases, the application server may independently decide to generate a ranked list of users for display to the user.

At 420, the application server receives, from a training server, user data generated based on attribute data and financial data associated with the user. As discussed above, the user data includes a financial profile for the user, a value array associated with the user, a journey array associated with the user, and a user identifier associated with the user. In general, the training server generates the user data as part of mapped data for a plurality of users. Prior to receiving the user data, the application server may request the user data from the training server.

At 430, the application server obtains, from the training server, clusters based on mapped data of a plurality of users. As discussed above, the training server may generate the clusters from the mapped data using an autoencoder and a clustering model. The clusters consist of clustered vectors of the mapped data, so that each cluster is associated with a group of similar users.

At 440 the application server determines, by comparing the user data with the clusters, a list of user identifiers corresponding to vectors of the clusters. In general, each vector within a cluster is similar to each other cluster in the vector, and thus the users associated with clustered vectors are similar. Thus, by locating the user identifiers of each vector in a cluster the application server can compile a list of user identifiers corresponding to users similar to the user.

At 450 the application server generates, based on the list of user identifiers and an application context, a ranked list of similar users. As discussed above, the type of application or the point in the flow of an application may be used as the application context in refining the ranked list of similar users. The application server makes use of a distance function to calculate the users associated with the users identifiers that are most similar to the user in ranked order.

At 460 the application server transmits the ranked list of similar users for display on a user device. The transmission may be from the application server to a client of the application server executing on the user device. The ranked list may be displayed within the client as part of a user interface of the application. In other embodiments the ranked list of similar users may be sent to the user in other formats, such as via an email to an email address of the user.

Some embodiments of method 400, further include receiving, from the training server, user profile types for the plurality of users. In such embodiments, method 400 may also include identifying a user profile type of the user and transmitting a set of users of the user profile type of the user to the user device.

Transmitting application data enabling the user to follow users of the ranked list of similar users may be included in some examples of method 400. The application data may include various UI elements that can be operated by the user to view information of the similar users, such as publically viewable financial data of the similar users, or what the user and the similar users have in common, in terms of common values or journey points. The user may select a UI element enabling following of the similar users such that, upon updates to the journey points of followed users, the user may be notified of such updates.

In certain cases, generating the ranked list of similar users at 450 may include determining, based on the application context, a type of application the user is using and altering the ranked list of similar users based on the type of application. For example, if the application the user is using is a tax return processing application, the ranked list of similar users may be altered to rank more highly users who are more similar in the fundamental tax return categories, such as income, deductions, or available tax credits.

In some embodiments of method 400, generating the ranked list of similar users includes determining, based on the application context, a point of an application the user has reached and altering the ranked list of similar users based on the point of the application. For example, if the application is a financial services application and the point the user has reached relates to payroll entry, the ranked list of similar users may be altered to rank more highly users who are more similar in payroll amounts or total entries on payroll.

In some examples of method 400 an autoencoder neural network that is configured to receive the mapped data as input and produce a lower dimensionality embedding via dimensionality reduction may be used. In such examples, a clustering model configured to cluster data points of the lower dimensionality embedding in order to identify similar data points within the lower dimensionality embedding may be used.

Figure 5:
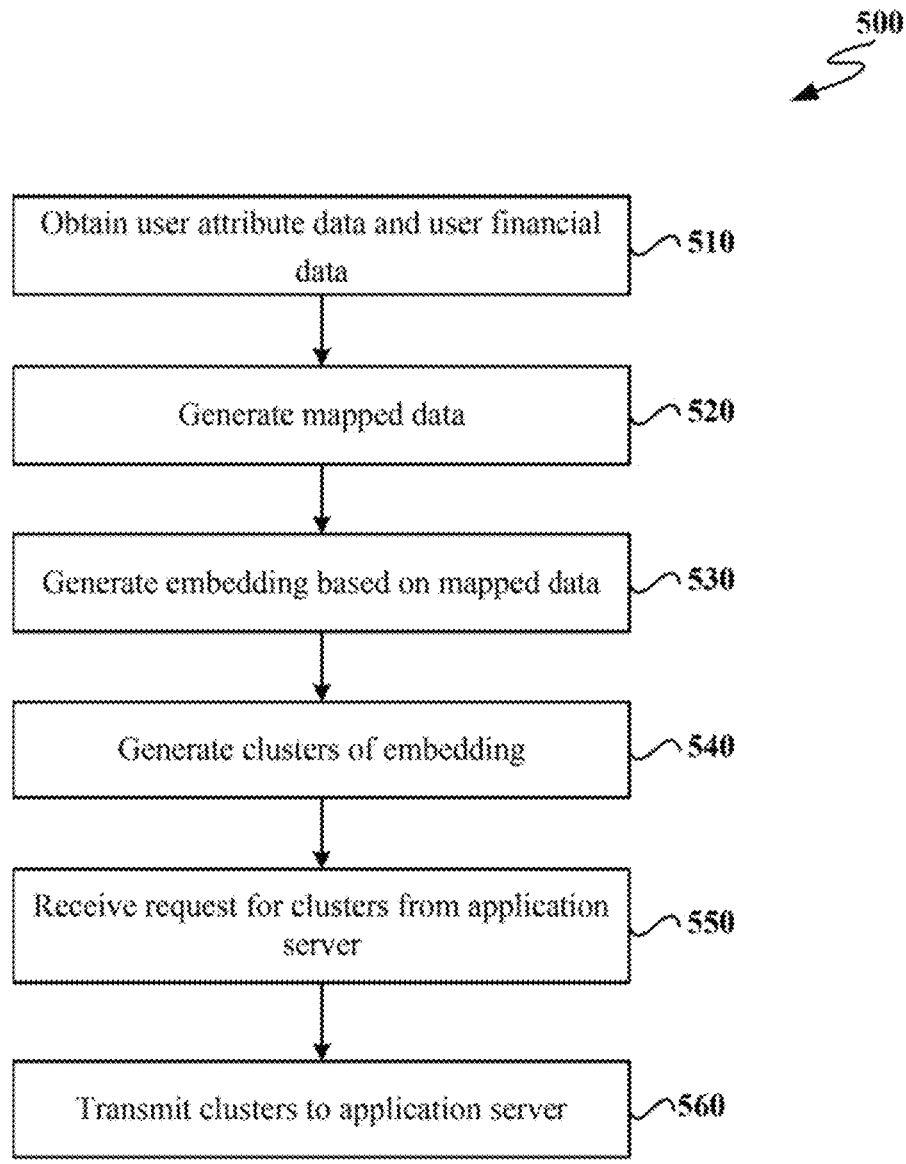
FIG. 5 is a flow diagram of a method for generating similarity clusters of a plurality of users.

FIG. 5 is a flow diagram of a method 500 for generating similarity clusters of a plurality of users. Method 500 may be performed by a training server, such as training server 110 of FIG. 1.

Method 500 begins at 510, where the training server obtains, from a user information database, a set of user attribute data and a set of user financial data associated with a plurality of users. In this example, both the set of user financial data and the set of user attribute data are obtained from a single user information database. In other embodiments, the training server may obtain the set of user financial data and the set of user attribute data may be obtained from separate databases, such as financial repository 112 and attribute repository 114 of FIG. 1.

At 520, the training server generates, based on the set of user attribute data and the set of user financial data, mapped data, as discussed in further detail above. In this example, the mapped data is a set of vectors, each vector including at least a user identifier for a user, a financial profile for the user, a value array for the user, and a journey array for the user.

At 530, the training server generates, by an autoencoder neural network based on the mapped data, an embedding, as discussed above.

At 540, the training server generates, by a clustering model, clusters of the embedding, as discussed above.

At 550 the training server receives a request for the clusters from an application server. The request may be sent by the application server after the application server receives a request from a user to view a ranked list of users similar to the user. The application server uses the clusters in order to determine the ranked list of users similar to the user.

At 560 the training server transmits the clusters to the application server, in order for the application server to determine the ranked list of users.

In some embodiments of method 500, generating the mapped data comprises, generating, by a profile mapper, a set of financial profiles for the plurality of users, generating, by a value mapper, a set of value arrays for the plurality of users and generating, by a journey mapper, a set of journey arrays for the plurality of users.

Some examples of method 500 further include generating financial scores scaled from 3 to 17 for the plurality of users based on the user financial data. In such examples, method 500 may further include determining, based on the financial scores, profile types of the plurality of users and transmitting the profile types of the plurality of users to the application server.

The embedding is a lower dimensionality representation of the mapped data in some examples of method 500.

Figure 6:
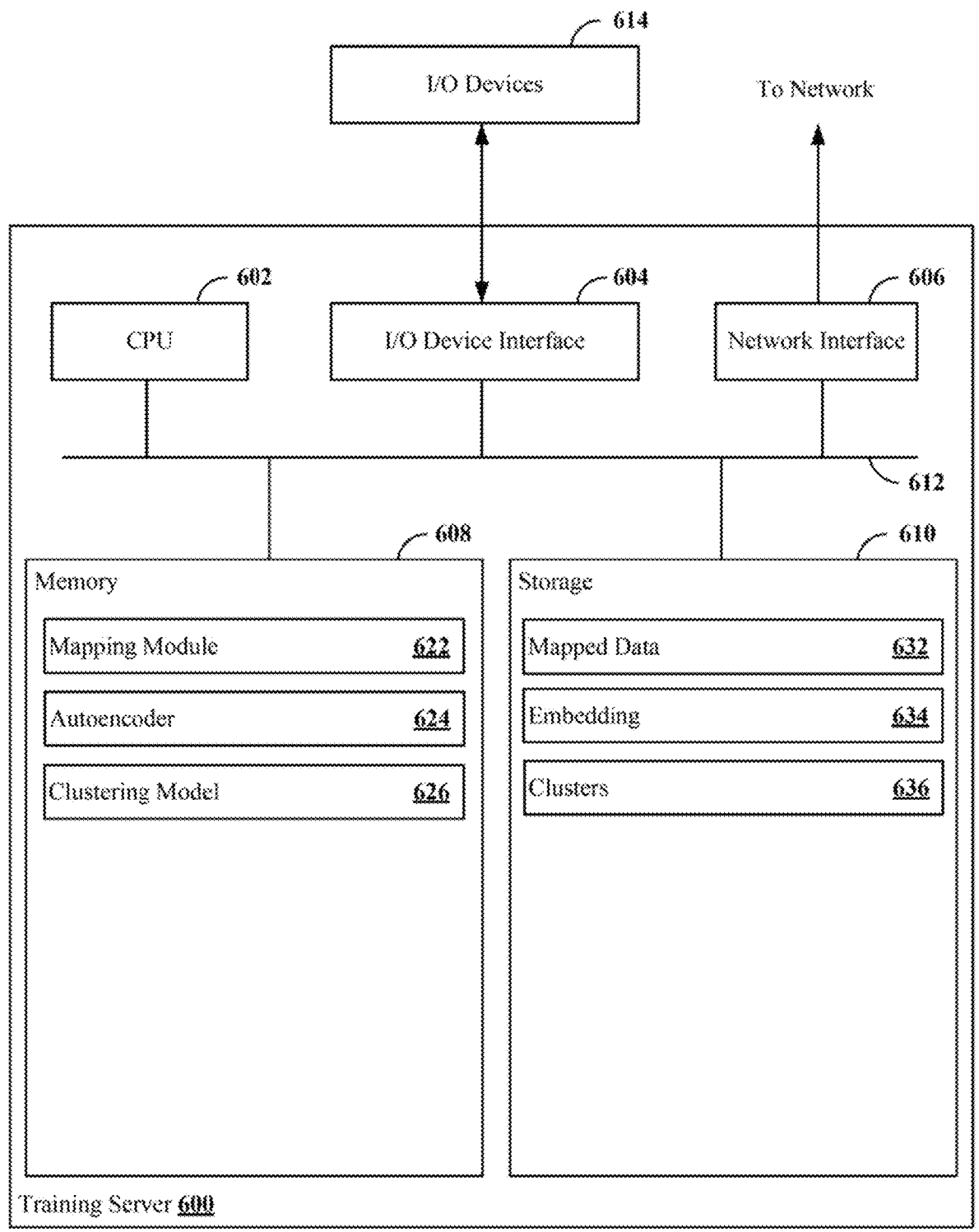
FIG. 6 depicts an example training server for using in generating similarity clusters.

FIG. 6 depicts an example training server 600 for using in generating similarity clusters. As shown, the training server 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to training server 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the training server 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes mapping module 622, autoencoder 624 and clustering model 626, which are software routines executed based on instructions stored in the storage 610. Such instructions may be executed by the CPU 602.

As shown, the storage 610 includes mapped data 632, embedding 634 and clusters 636. Mapping module 622 obtains data from one or more databases (such as via network interface 606) and maps that data to financial profiles, value arrays and journey arrays, stored as mapped data 632. Autoencoder 624 then generates embedding 634 based on mapped data 632. Embedding 634 is then used by clustering model 626 to generate clusters 636. Once clustering 636 is generated, training server 600 is able to respond to requests from an application server to use clustering 636 in generating a ranked list of users similar to a particular user.

Figure 7:
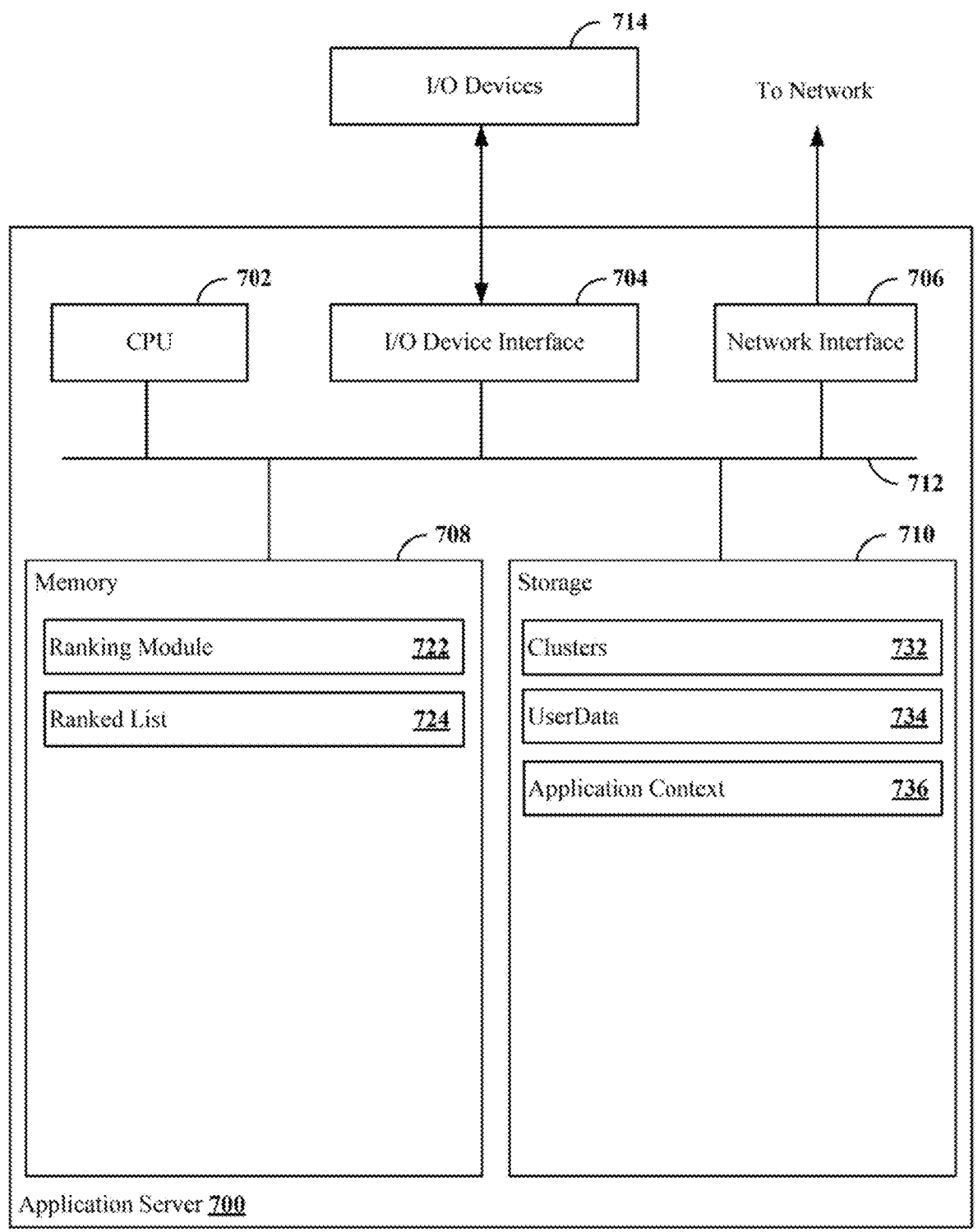
FIG. 7 depicts an example application server for using in ranking users based on similarity.

FIG. 7 depicts an example application server 700 for using in generating similarity clusters. As shown, the application server 700 includes, without limitation, a central processing unit (CPU) 702, one or more input/output (I/O) device interfaces 704, which may allow for the connection of various I/O devices 714 (e.g., keyboards, displays, mouse devices, pen input, etc.) to application server 700, network interface 706, memory 708, storage 710, and an interconnect 712.

The CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. The CPU 702 is included to be representative of a single CPU, multiple CPUs, a single CPU having multiple processing cores, and the like. The I/O device interface 704 may provide an interface for capturing data from one or more input devices integrated into or connected to the application server 700, such as keyboards, mice, touchscreens, and so on. The memory 708 may represent a random access memory (RAM), while the storage 710 may be a solid state drive, for example. Although shown as a single unit, the storage 710 may be a combination of fixed and/or removable storage devices, such as fixed drives, removable memory cards, network attached storage (NAS), or cloud-based storage.

As shown, the memory 708 includes ranking module 722 and ranked list 724. Ranking module 722 is a software routine executed based on instructions stored in the storage 710. Such instructions may be executed by the CPU 702. Ranked list 724 is a data element temporarily resident in memory 708.

As shown, the storage 710 includes clusters 732, user data 734 and application context 736. Clusters 732 are obtained by application server 700 from a training server, via network interface 706. Ranking module 722 uses clusters 732, user data 734 and application context 736 to generate ranked list 724, a ranked list of users similar to a user associated with user data 734. Ranked list 724 can then be transmitted by application server 700 to a user device associated with the user (not shown).

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for ranking users based on similarity, comprising:
    receiving a request to view a list of users similar to a first user;
    retrieving a first user identifier corresponding to mapped data for the first user;
    based on determining that the first user is part of an existing plurality of users, receiving a plurality of clusters of users based on mapped data of each of a plurality of users, wherein:
        the mapped data of a respective user in the plurality of users comprises attribute data and financial data associated with the respective user,
        the plurality of clusters of users comprises a first cluster of users associated with the first user identifier, wherein the first cluster of users comprises the first user, and
        the plurality of clusters of users is generated by operation of an autoencoder neural network and a clustering model using the mapped data as input;
    locating the first cluster of users based on the first user identifier;
    generating a ranked list of users similar to the first user based on a distance function comparing the first user to other users in the first cluster of users comprising the first user by:
        using an application context for the first user to refine the ranked list of users similar to the first user;
        determining, based on the application context, a point of a flow of an application the first user has reached; and
        altering the ranked list of users similar to the first user based on the point of the flow of the application; and
    transmitting the ranked list of users similar to the first user to a user device for display.

2. The method of claim 1, further comprising receiving user profile types for the plurality of users.

3. The method of claim 2, further comprising:
    identifying a profile type of the first user; and
    transmitting a subset of users of the plurality of users associated with the profile type of the first user to the user device.

4. The method of claim 1, further comprising transmitting application data including user interface elements for display on the user device that enable the first user to select users of the ranked list of users similar to the first user.

5. The method of claim 1, wherein the autoencoder neural network is configured to receive the mapped data as input and produce a lower dimensionality embedding via dimensionality reduction.

6. The method of claim 5, wherein the clustering model in configured to cluster data points of the lower dimensionality embedding in order to identify similar data points within the lower dimensionality embedding.

7. The method of claim 1, further comprising determining a financial score based on the financial data associated with the respective user.

8. The method of claim 1, wherein the attribute data comprises a set of value arrays and a set of journey arrays.

9. The method of claim 8, wherein the mapped data comprises a set of vectors corresponding to the set of value arrays and the set of journey arrays.

10. A computing system comprising:
    a processor; and
    a memory including computer readable instructions, which, when executed by the processor, cause the computing system to perform a method for ranking users based on similarity, the method comprising:
        receiving a request to view a list of users similar to a first user;
        retrieving a first user identifier corresponding to mapped data for the first user;
        based on determining that the first user is part of an existing plurality of users, receiving a plurality of clusters of users based on mapped data of each of a plurality of users, wherein:
            the mapped data of a respective user in the plurality of users comprises attribute data and financial data associated with the respective user,
            the plurality of clusters of users comprises a first cluster of users associated with the first user identifier, wherein the first cluster of users comprises the first user, and
            the plurality of clusters of users is generated by operation of an autoencoder neural network and a clustering model using the mapped data as input;
        locating the first cluster of users based on the first user identifier;
        generating a ranked list of users similar to the first user based on a distance function comparing the first user to other users in the first cluster of users comprising the first user by:
            using an application context for the first user to refine the ranked list of users similar to the first user;
            determining, based on the application context, a point of a flow of an application the first user has reached; and
            altering the ranked list of users similar to the first user based on the point of the flow of the application; and
        transmitting the ranked list of users similar to the first user to a user device for display.

11. The computing system of claim 10, the method further comprising receiving user profile types for the plurality of users.

12. The computing system of claim 11, the method further comprising:
   identifying a profile type of the first user; and
   transmitting a subset of users of the plurality of users associated with the profile type of the first user to the user device.

13. The computing system of claim 10, the method further comprising transmitting application data including user interface elements for display on the user device that enable the first user to select users of the ranked list of users similar to the first user.

14. The computing system of claim 10, wherein the autoencoder neural network is configured to receive the mapped data as input and produce a lower dimensionality embedding via dimensionality reduction.

15. The computing system of claim 14, wherein the clustering model is configured to cluster data points of the lower dimensionality embedding in order to identify similar data points within the lower dimensionality embedding.

16. The computing system of claim 10, further comprising determining a financial score based on the financial data associated with the respective user.

17. The computing system of claim 10, wherein the attribute data comprises a set of value arrays and a set of journey arrays.

18. The computing system of claim 17, wherein the mapped data comprises a set of vectors corresponding to the set of value arrays and the set of journey arrays.

\* \* \* \* \*